US009581922B2

(12) United States Patent
Sanchez Garcia et al.

(10) Patent No.: US 9,581,922 B2
(45) Date of Patent: Feb. 28, 2017

(54) TREATED FUMED SILICA (71) Applicant: Cabot Corporation, Boston, MA (US)

(72) Inventors: Angelica Maria Sanchez Garcia, Birmingham, MI (US); Elizabeth Sims, Bedford, MA (US); Sean Sullivan, Lynn, MA (US); Geary Graham, Savoy, IL (US); Hajime Kambara, Westford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/387,334

(22) PCT Filed: Mar. 14, 2013

(86) PCT No.: PCT/US2013/031274
§ 371 (c)(1),
(2) Date: Sep. 23, 2014

(87) PCT Pub. No.: WO2013/148241
PCT Pub. Date: Oct. 3, 2013

(65) Prior Publication Data
US 2015/0079512 A1 Mar. 19, 2015

Related U.S. Application Data

(60) Provisional application No. 61/615,654, filed on Mar. 26, 2012, provisional application No. 61/745,906, filed on Dec. 26, 2012.

(51) Int. Cl.
*G03G 9/097* (2006.01)
*G03G 9/08* (2006.01)
(Continued)

(52) U.S. Cl.
CPC ............. *G03G 9/08* (2013.01); *C08G 77/38* (2013.01); *C09C 1/3081* (2013.01);
(Continued)

(58) Field of Classification Search
CPC ..... C09C 1/3081; C01P 2006/22; C08G 77/38
See application file for complete search history.

(56) References Cited

U.S. PATENT DOCUMENTS 4,868,084 A 9/1989 Uchide et al.
4,950,502 A 8/1990 Saam et al.
(Continued)

FOREIGN PATENT DOCUMENTS

EP 0869762 B1 7/2003
JP 59-172553 A 9/1984
(Continued)

OTHER PUBLICATIONS

Translation of JP 2011-506259 published Mar. 2011.*
(Continued)

*Primary Examiner* — Peter Vajda (57) ABSTRACT

Disclosed herein are treated fumed silica particles comprising a modified polydialkylsiloxane on the surface thereof, a method for preparing treated fumed silica particles, and a rheological system comprising a polar liquid and treated fumed silica particles. Also disclosed are toner compositions comprising toner particles and treated fumed silica particles comprising a modified polydialkylsiloxane.

22 Claims, 2 Drawing Sheets

(51) Int. Cl.
*C09C 1/30* (2006.01)
*C08G 77/38* (2006.01)

(52) U.S. Cl.
CPC ..... *G03G 9/09716* (2013.01); *G03G 9/09725* (2013.01); *C01P 2006/22* (2013.01)

(56) References Cited

U.S. PATENT DOCUMENTS

| | | | |
|---|---|---|---|
| 5,013,585 | A | 5/1991 | Shimizu et al. |
| 5,039,736 | A | 8/1991 | Fujiki |
| 5,486,420 | A | 1/1996 | Nishihara et al. |
| 5,520,917 | A | 5/1996 | Mizuguchi et al. |
| 5,756,788 | A | 5/1998 | Mitchnick et al. |
| 5,824,739 | A | 10/1998 | Kondo et al. |
| 5,843,525 | A | 12/1998 | Shibasaki et al. |
| 5,908,660 | A | 6/1999 | Griffith et al. |
| 6,022,404 | A | 2/2000 | Ettlinger et al. |
| 6,051,672 | A | 4/2000 | Burns et al. |
| 6,184,408 | B1 | 2/2001 | Burns et al. |
| 6,200,580 | B1 | 3/2001 | Horino et al. |
| 6,503,676 | B2 | 1/2003 | Yamashita et al. |
| 6,602,945 | B2 | 8/2003 | Kobayashi et al. |
| 6,623,791 | B2 | 9/2003 | Sadvary et al. |
| 6,830,811 | B2 | 12/2004 | Chao |
| 6,899,951 | B2 | 5/2005 | Panz et al. |
| 7,022,375 | B2 | 4/2006 | Schachtely et al. |
| 7,109,256 | B2 | 9/2006 | Amano et al. |
| 7,255,735 | B2 | 8/2007 | Meyer et al. |
| 7,262,233 | B2 | 8/2007 | Isarov et al. |
| 7,276,615 | B2 | 10/2007 | Gottschalk-Gaudig et al. |
| 7,332,144 | B2 | 2/2008 | Konya et al. |
| 7,390,349 | B2 | 6/2008 | Lautamo |
| 7,449,193 | B2 | 11/2008 | Kanemaru et al. |
| 7,553,889 | B2 | 6/2009 | Christian et al. |
| 7,612,137 | B2 | 11/2009 | Brinkmann et al. |
| 7,641,972 | B2 | 1/2010 | Nolte et al. |
| 7,811,540 | B2 | 10/2010 | Adams |
| 8,470,443 | B2 | 6/2013 | Gottschalk-Gaudig et al. |
| 2003/0138715 | A1 | 7/2003 | Barthel et al. |
| 2006/0050130 | A1 | 3/2006 | Yoshida et al. |
| 2006/0110542 | A1 | 5/2006 | Dietz et al. |
| 2007/0071980 | A1 | 3/2007 | Kamei et al. |
| 2008/0064790 | A1 | 3/2008 | Canpont et al. |
| 2008/0069753 | A1 | 3/2008 | Floess et al. |
| 2008/0070140 | A1 | 3/2008 | Fomitchev et al. |
| 2008/0095698 | A1 | 4/2008 | Fomitchev et al. |
| 2009/0311159 | A1 | 12/2009 | Gray |
| 2010/0263574 | A1 | 10/2010 | Gottschalk-Gaudig et al. |
| 2010/0288795 | A1 | 11/2010 | Lortz et al. |
| 2011/0177446 | A1 | 7/2011 | Kaneeda et al. |
| 2012/0305842 | A1* | 12/2012 | Torii ...................... A61L 15/18 252/194 |

FOREIGN PATENT DOCUMENTS

| | | |
|---|---|---|
| JP | 2000-066439 A | 3/2000 |
| JP | 2002-256170 A | 9/2002 |
| JP | 2011-064868 A | 3/2011 |
| JP | 2011-506259 * | 3/2011 |
| WO | WO 2011/126552 A2 | 10/2011 |

OTHER PUBLICATIONS

Castaing, J.-C. et al. "Nanosized hairy grains: A model system to understand the reinforcement," Europhysics Letters, 36 (2), Oct. 10, 1996, pp. 153-158.
Chao, Timothy C. et al. "Silyation of Partially Aggregrated Colloidal Silica Nanoparticles for Reinforcement in Silicone Elastomers," Mat. Res. Soc. Symp. Proc. vol. 778: Materials Research Society, 2003, pp. U5.11.1-U5.11.6.
Dvornic, Petar R., "Thermal Properties of Polysiloxanes," in RG Jones et al. (Eds), Silicon-containing polymers, Netherlands: Kluwer Academic Publishers, 2000, pp. 185-212.
International Search Report and the Written Opinion of the International Searching Authority, or the Declaration of International Patent Application No. PCT/US2013/031274, mailed on Jun. 27, 2013.
International Preliminary Report on Patentability (Chapter I of the Patent Cooperation Treaty), of International Patent Application No. PCT/US2013/031274, mailed on Oct. 9, 2014.

* cited by examiner

TREATED FUMED SILICA

RELATED APPLICATIONS

This application is a 371 National Stage Application based on International Application No. PCT/US2013/031274 filed on Mar. 14, 2013 which claims priority under 35 U.S.C. §119(e) to U.S. Prov. App. 61/615,654, filed Mar. 26, 2012 and 61/745,906, filed Dec. 26, 2012, the disclosure of which is incorporated herein by reference.

FIELD OF THE INVENTION

Disclosed herein are treated fumed silica particles. Also disclosed are the use of the treated fumed silica particles in adhesive, sealant, and toner compositions.

BACKGROUND

Structured fluids with a relatively high resistance to flow (yield stress) are highly demanded in the adhesives, gel coats, composites, and coatings markets. One method of modifying the rheological properties of such compositions is to incorporate particles, particularly fumed silica particles, into the composition. Fumed silica has a low bulk density and high surface area, and its three-dimensional structure results in viscosity-increasing, thixotropic behavior when used as a thickener or reinforcing filler. When used in a matrix (e.g., polymer, solvent, resin, etc.), the flow properties of the composition are determined by particle-matrix and particle-particle interactions. In order to obtain desirable properties, the particle-particle interactions must be strong enough relative to the particle-matrix interactions to form a network of particles in the composition. If the particle-particle interactions are weaker or smaller in number than the particle-matrix interactions, the system will act as a suspension and a network will not be formed. Thus, in polar systems, highly hydrophobic particles have been used as rheological control agents. However, highly hydrophobic particles can be difficult to disperse in a polar matrix, and may tend to remain agglomerated as they were in the powder form, thereby reducing the number of contact points that are necessary to create a strong network. This not only creates difficulties in processing, but also may result in sub-optimal initial or retained yield-stress properties. Thus, there is a need for treated silica particles that can provide improved rheological performance.

Electrophotographic image formation comprises developing an electrostatic latent image formed on a photoreceptor with a toner comprising a colorant dispersed in a binder resin, transferring the toner image to a receiving paper, and fixing the transferred toner image by means of, for example, a hot roll. The photoreceptor is cleaned after the transferring step to prepare for the next latent image formation.

Silica particles are often combined with toner particles to improve one or more selected properties of the toner particles, including fluidity, transferability, fixability, and cleaning properties. Typically, the silica particles are subjected to a chemical treatment to render the surface of the particles hydrophobic. However, there is a continued need for developing treated silicas to provide desired properties applicable for toner compositions.

SUMMARY

One embodiment provides a treated fumed silica particle comprising a modified polydialkylsiloxane on the surface thereof. The modified polydialkylsiloxane (i) comprises a relative proportion of T2 groups of 20% or less, and a relative proportion of T1 groups of 10% or less; and (ii) comprises groups having the structure:

wherein X is a trialkylsilyl or dialkylsilyl; and $R^1$, $R^2$ and $R^3$ are independently hydroxyl, alkyl, alkoxy, silyl, or siloxy. The treated fumed silica particle has a surface silanol content of about 1 to about 2.2 $SiOH/nm^2$. Also provided is a rheological system comprising the treated fumed silica particle and a polar liquid.

Another embodiment provides a method for preparing a treated fumed silica particle comprising (a) dispersing 1-30 wt % polydialkylsiloxane-treated silica particles with 0-15 wt % water to provide a water-in-silica dispersion; (b) combining the water-in-silica dispersion with a treating agent to provide a reaction mixture, wherein the treating agent comprises (i) a silazane, or (ii) an alkoxysilane or siloxane and an amine; and (c) maintaining the reaction mixture in an inert atmosphere at 25-300° C. for 5 min-24 hours to provide the treated fumed silica particle.

Another embodiment provides a toner composition comprising toner particles and treated fumed silica particles, wherein the fumed silica particles comprise a modified polydialkylsiloxane on the surface thereof, and wherein:

(a) the modified polydialkylsiloxane (i) comprises a relative proportion of T2 groups of 20% or less, and a relative proportion of T1 groups of 10% or less; and (ii) comprises groups having the structure:

wherein X is a trialkylsilyl or dialkylsilyl; and $R^1$, $R^2$ and $R^3$ are independently hydroxyl, alkyl, alkoxy, silyl, or siloxy; and (b) the silica particle has a surface silanol content of about 1 to about 2.2 $SiOH/nm^2$.

Another embodiment provides a toner composition comprising toner particles and treated fumed silica particles, the treated fumed silica particles prepared by a method comprising:

(a) dispersing 1-30 wt % polydialkylsiloxane-treated silica particles with 0-15 wt % water to provide a water-in-silica dispersion;

(b) combining the water-in-silica dispersion with a treating agent to provide a reaction mixture, wherein the treating agent comprises (i) a silazane, or (ii) an alkoxysilane or siloxane and an amine; and (c) maintaining the reaction mixture in an inert atmosphere at 25-300° C. for 5 min-24 hours to provide the treated fumed silica particle.

DETAILED DESCRIPTION

Disclosed herein are treated fumed silica particles comprising a modified polydialkylsiloxane on the surface thereof. Also disclosed are toner compositions comprising toner particles and the treated fumed silica particles.

Fumed silica comprises microscopic droplets of amorphous silica fused into branched, chainlike, three-dimensional secondary particles which then agglomerate into tertiary particles. Fumed silica typically has a high surface area (e.g., 50-600 m²/g) and low bulk density (e.g., 0.03-0.2 g/cm³). Any suitable fumed silica can be used, such as commercially available fumed silicas including, but not limited to ULTRABOND™ 4740 and Cabot CAB-O-SIL® TS720 both by Cabot Corporation). In one embodiment, the treated fumed silica particles disclosed herein have a surface area ranging from 30 m²/g to 350 m²/g.

The surface chemistry of untreated fumed silica is dominated by silanol groups. However, fumed silica can be treated with a hydrophobic treating agent to reduce or substantially eliminate surface silanol groups in an effort to render the silica particle partially or completely hydrophobic. When a silica particle is treated with a polydialkylsiloxane (PDAS), for instance, the PDAS chain reacts with one or more silanol groups on the silica surface replacing them with siloxane bonds between the silica atoms of the PDAS and the surface silicon atoms. Thus, a hydrophobically treated silica has a reduced surface silanol content as compared to the untreated silica.

The PDAS itself comprises silicon atoms with functional groups, which can be classified according to the number of Si—O—Si bonds associated therewith. Thus, for instance, a T1 group is a silicon atom with three functional groups and only a single Si—O—Si bond; a T2 group is a silicon atom with two functional group and two Si—O—Si bonds; and a T3 group is a silicon atom with a single functional group and three Si—O—Si bonds.

The functional groups of a PDAS chain often are alkyl or other hydrocarbon containing groups that impart hydrophobic properties. However, during the treatment or post-processing of the silica, the functional groups can be oxidized resulting in a certain proportion of silanol groups on the PDAS chain itself, sometimes referred to as silanol-on-silane.

The treated silica particle provided herein comprises a modified PDAS having the structure:

wherein X is a trialkylsilyl or dialkylsilyl, such as trimethylsilyl, and $R^1$, $R^2$ and $R^3$ are independently hydroxyl, alkyl, alkoxy, silyl, or siloxy. In one embodiment, $R^1$ is hydroxyl, alkyl, alkoxy, silyl, or siloxy and $R^2$ and $R^3$ are alkyl. In another embodiment, $R^1$, $R^2$, and $R^3$, are independently methyl or ethyl.

The modified polydialkylsiloxane also comprises a relative proportion of T2 groups of about 20% or less, such as about 18% or less, about 16% or less, about 14% or less, about 10% or less, or about 1% or less, and a relative proportion of T1 groups of about 10% or less, such as about 8% or less, about 6% or less, about 4% or less, or about 1% or less.

In one embodiment, the treated fumed silica particle has a surface silanol content of about 1 to about 2.2 $SiOH/nm^2$, for instance, about 1.1 to about 2.2 $SiOH/nm^2$, about 1.2 to about 2.2 $SiOH/nm^2$, about 1.3 to about 2.2 $SiOH/nm^2$, about 1.4 to about 2.2 $SiOH/nm^2$, about 1.5 to about 2.2 $SiOH/nm^2$, about 1.6 to about 2.2 $SiOH/nm^2$, about 1.7 to about 2.2 $SiOH/nm^2$, or about 1.8 to about 2.2 $SiOH/nm^2$.

Without wishing to be bound by any theory or mechanism of action, it is believed that a treated fumed silica particle as described herein has a balance of hydrophobic properties exerted by the modified PDAS and hydrophilic properties provided by the surface silanol concentration, which allows the particle to provide superior rheological performance properties when combined with a polar matrix fluid.

The treated fumed silica particle can be further characterized by its surface energy (SEP04). SEP04 can be measured as described in U.S. Pat. No. 7,776,603 B2, which is herein incorporated by reference. Briefly, this method identifies the surface properties of a particulate material by means of measuring the spreading pressure of a gas, e.g., water, ethylamine, or chloroform, on the particulate material of interest. In some embodiments, the treated fumed silica particles have a SEP04 value of about 1 $mJ/m^2$ or more, about 2 $mJ/m^2$ or more, about 3 $mJ/m^2$ or more, about 4 $mJ/m^2$ or more, about 5 $mJ/m^2$ or more, about 6 $mJ/m^2$ or more, or about 10 $mJ/m^2$ or more.

The treated fumed silica particles also can be characterized by initial yield stress (IYS) when incorporated in a polar liquid matrix. Yield stress can be determined from a rheological experiment using any of the viscoplastic models available in the literature (Macosko, *Rheology: Principles and Measurements and Applications*, VCH, New York (1994)). One example of a protocol for determining yield stress is described in the Examples provided herein. In one embodiment, the treated fumed silica particles exhibit an IYS of about 30 Pa or more, about 50 Pa or more, about 70 Pa or more, or even about 90 Pa or more, as measured using the protocol described in the Examples.

The treated fumed silica particles can be characterized by their ability to retain a yield stress over time. The retained yield stress can be measured according to following equation: Retained Yield Stress (%)=Yield Stress at Time $t_2$/Yield Stress at Time $t_1$, where $t_1$ is less than $t_2$, at a given temperature T. The retained yield stress may be measured after any duration of time (t) subsequent mixing of the particles with the polar matrix liquid, such as 1 minute, 10 minutes, 1 hour, 1 day, 5 days, 10 days, 20 days, 30 days, 50, days, or 100 days, at any temperature (T), such as 0° C., 20° C., 40° C., 60° C., 80° C., or 100° C. In one embodiment, the retained yield stress is about 60% or more, about 70% or more, about 80% or more, about 90% or more, or even about 100% when measured after 28 days or longer at 60° C. (i.e., Retained Yield Stress (%)=100*(Yield Stress after 28 days @ 60° C./Yield Stress on Day 1)).

In one embodiment, the treated fumed silica particle has a relatively short wet-in time, which refers to the amount of time it takes to incorporate treated fumed silica material into a polar liquid matrix, such as an epoxy resin. In one embodiment, the particles exhibit a wet-in time about 15 minutes or less, such as about 10 minutes or less, about 8 minutes or less, about 6 minutes or less, or about 5 minutes or less when mixed into an Bisphenol A diglycidyl ether epoxy resin (e.g., Epon 828 by MOMENTIVE®) at a concentration of 4 wt %.

Also disclosed herein are methods for preparing treated fumed silica particles having properties as described herein. The method comprises (a) dispersing polydialkylsiloxane-treated silica particles with water to provide a water-in-silica dispersion; (b) combining the water-in-silica dispersion with a treating agent to provide a reaction mixture; and (c) maintaining the reaction mixture in an inert atmosphere to provide the treated fumed silica particle.

Any suitable amount of polydialkylsiloxane-treated silica particles and water can be combined to provide the water-in-silica dispersion. In one embodiment, the silica and water are used in proportions sufficient to provide a "dry" dispersion, also referred to as "dry water." In one embodiment, the method comprises dispersing 1-30 wt % polydialkylsiloxane-treated silica particles with 0-15 wt % water to provide the water-in-silica dispersion. In another embodiment, the water-in-silica dispersion comprises greater than a stoichiometric amount of water relative to the treating agent.

In one embodiment, the treating agent comprises (i) a silazane, or (ii) an alkoxysilane or siloxane and an amine. Examples of suitable treating agents include hexamethyldisilazane (HMDZ), vinyl silazane (VHMDZ), methoxytrimethylsilane or trimethylmethoxysilane used in combination with an amine, or combinations thereof. The amine can be a primary, secondary, or tertiary amine, including ammonia. Multiple treating agents can be used, either simultaneously or sequentially.

The treating agent can be combined with the water-in-silica dispersion in any suitable proportion to provide a reaction mixture. In one embodiment, the method comprises combining about 1-15 wt % of a treating agent based on the weight of the dry silica with the water-in-silica dispersion.

The treating agent can be combined with the water-in-silica dispersion in any suitable manner. For instance, the treating agent can be aerosolized or atomized and combined with the water-in silica dispersion.

The reaction mixture can be maintained in an inert atmosphere for a duration and at a temperature sufficient to provide a particle with the desired characteristics. In one embodiment, the reaction mixture is maintained at a temperature ranging from 25-300° C., such as from 25-100° C., or even from 25-60° C. The reaction mixture can be maintained for any suitable time, such as from 5 min-24 hours, from 5 min-6 hours, or even from 5-60 min. In one embodiment, the reaction mixture can be maintained with agitation or under fluidizing conditions.

In one embodiment, the method disclosed herein uses a polydialkylsiloxane (PDAS)-treated fumed silica particle as a starting material. Any suitable PDAS-treated silica particle can be used. For example, a PDAS-treated silica particle with a carbon content of about 5-7%, a surface silanol content of about 0-1.5 SiOH/nm$^2$, and/or a silanol on silane content of about 0.1 SiOH/nm$^2$ or lower can be used. PDAS-treated silica particles are commercially available, some of which are identified in the Examples.

The method can further comprise venting byproducts of the reaction from the reaction mixture. In one embodiment, the reaction mixture byproducts are vented at a temperature ranging from 60-300° C.

In one embodiment, the method produces a treated fumed silica particle that exhibits an increased initial yield stress (IYS) as compared to the PDAS-treated silica particle used as starting material when incorporated into a polar matrix fluid. The relative change in IYS is determined according to the following equation: Relative Change IYS (%)=(IYS$_{post-treatment}$−IYS$_{pre-treatment}$/IYS$_{pre-treatment}$)× 100%, wherein IYS$_{post-treatment}$ refers to the IYS of the treated fumed silica particle resulting from the methods disclosed herein, and IYS$_{pre-treatment}$ refers to the IYS of the PDAS-treated silica starting material. The IYS of the particles produced by the inventive method desirably exhibit an IYS that is higher than the IYS of the starting PDAS-treated fumed silica particle, such as 1% higher, 5% higher, 20% higher, 50% higher, or 100% higher, or more. The IYS can be measured by the method described in the Examples.

One embodiment provides a rheological system comprising a polar liquid and a treated fumed silica particle. The rheological system comprises any amount of treated fumed silica particles. In one embodiment, the rheological system comprises from 0.5-15% by weight of the treated fumed silica particles.

The polar liquid can be any polar liquid, including, but not limited to, polar sealants and adhesives, particularly epoxies. Suitable polar compositions include, for instance, unsaturated polyester resins, polyurethane, silane-terminated polymers, vinyl ester resins, acrylates, cyanoacrylates, methylmethacrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulphide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles, polysulphones, silicones, silane-crosslinked polymers or mixtures thereof.

The rheological system can further comprise additives typically included in adhesive or sealant compositions. Non-limiting examples of such additives include solvents, water, surfactants, fillers, thixotropic agents in addition to the disclosed treated silica, adhesion promoters, colorants, catalysts, and aging inhibitors. In one embodiment, the rheological system does not contain additives that are not typically contained in an adhesive or sealant composition other than the treated fumed silica disclosed herein.

In one embodiment, the rheological system exhibits a high retained yield stress. The retained yield stress can be determined according to following equation: Retained Yield Stress (%)=100*(Yield Stress at Time $t_2$/Yield Stress at Time $t_1$), at a given temperature T. The retained yield stress may be measured after any duration of time (t) subsequent mixing of the particles with the polar matrix liquid, such as 1 minute, 10 minutes, 1 hour, 1 day, 5 days, 10 days, 20 days, 30 days, 50, days, or 100 days, at any temperature (T), such as 0° C., 20° C., 40° C., 60° C., 80° C., or 100° C. In one embodiment, the retained yield stress is about 60% or more, about 70% or more, about 80% or more, about 90% or more, or even about 100% when measured after 28 days or longer at 60° C. (i.e., Retained Yield Stress (%)=Yield Stress after 28 days @ 60° C./Yield Stress on Day 1).

In one embodiment, the rheological system retains a high percentage of its viscosity over time. In one embodiment, the retained viscosity is about 60% or more, about 70% or more, about 80% or more, about 90% or more, or even about 100% over a period of 28 days when measured by the same method described herein for determining yield stress, with viscosity extracted at a shear rate ranging from 0.01 to 1000 s$^{-1}$, e.g., a shear rate ranging from 0.01 to 10 s$^{-1}$.

One embodiment provides a toner composition comprising the treated fumed silica particles and toner particles. The toner particles can be any suitable toner particles. Suitable toner particles typically comprise a colorant and a binder resin.

The colorant can be any suitable colorant. A wide range of colored pigments, dyes, or combinations of pigments and dyes can be used as the colorant. The colorant can be blue, brown, black such as carbon black, cyan, green, violet, magenta, red, yellow, as well as mixtures thereof. Suitable classes of colored pigments and dyes include, for example, anthraquinones, phthalocyanine blues, phthalocyanine greens, diazos, monoazos, pyranthrones, perylenes, heterocyclic yellows, quinacridones, and (thio)indigoids. The colorant can be present in any suitable amount, e.g., an amount sufficient to provide the desired color to the toner composition. Generally, the colorant is present in an amount of about 1% by weight to about 30% by weight of the toner composition; however, lesser or greater amounts of the colorant can be utilized.

The binder resin can be any suitable binder resin. Illustrative examples of suitable binder resins include homopolymers and copolymers of polyesters, polyamides, polyolefins, styrene acrylates, styrene methacrylates, styrene butadienes, crosslinked styrene polymers, epoxies, polyurethanes, vinyl resins, including homopolymers or copolymers of two or more vinyl monomers, polyesters, and mixtures thereof. In one embodiment, the binder resin can include (a) homopolymers of styrene and its derivatives and copolymers thereof such as polystyrene, poly-p-chlorostyrene, polyvinyltoluene, styrene p-chlorostyrene copolymer, and styrene vinyltoluene copolymer, (b) copolymers of styrene and acrylic acid ester such as styrenemethyl acrylate copolymer, styrene ethyl acrylate copolymer, styrene-n-butyl acrylate copolymer, and styrene-2-ethylhexyl acrylate copolymer, (c) copolymers of styrene and methacrylic acid ester such as styrene methyl methacrylate, styrene ethyl methacrylate, styrene n-butyl methacrylate, and styrene 2-ethylhexyl methacrylate, (d) multi-component copolymers of styrene, acrylic acid ester, and methacrylic acid ester, (e) styrene copolymers of styrene with other vinyl monomers such as acrylonitrile, vinyl methyl ether, butadiene, vinyl methyl ketone, acrylonitrile-indene, and maleic acid ester, (f) polymethyl methacrylate, polybutyl methacrylate, polyvinyl acetate, polyvinyl butyral, polyacrylic acid resin, phenolic resin, aliphatic or alicyclic hydrocarbon resin, petroleum resin, and chlorin paraffin, and (g) mixtures thereof. Other types of suitable binder resins are known to those skilled in the art. The binder resin can be present in any suitable amount, typically about 60 wt. % to about 95 wt. % (e.g., about 65 wt. % to about 90 wt. %, or about 70 wt. % or about 85 wt. %) of the toner composition.

The surface-treated silica particles can be present in any suitable amount in the toner composition. The surface-treated silica particles can be present in an amount of about 0.01 wt. % or more (e.g., about 0.05 wt. % or more, about 0.1 wt. % or more, about 0.5 wt. % or more, about 1 wt. % or more, about 2 wt. % or more, about 3 wt. % or more, about 4 wt. % or more, or about 5 wt. % or more) based on the total weight of the toner composition. In addition, the surface-treated silica particles can be present in an amount of about 10 wt. % or less (e.g., about 8 wt. % or less, about 6 wt. % or less, about 5 wt. % or less, or about 4 wt. % or less) based on the total weight of the toner composition. For example, the surface-treated silica particles can be present in an amount of about 0.01 wt. % to about 10 wt. % (e.g., about 0.1 wt. % to about 8 wt. %, about 0.5 wt. % or about 5 wt. %, or about 0.1% to 4%) based on the total weight of the toner composition (e.g., the total weight of the toner particles). For example, the treated fumed silica can be present in the toner composition with a loading ranging from 0.1% to 4% by weight relative to the formulated toner.

Optional additives can be present in the toner composition, such as, for example, magnetic material; carrier additives; positive or negative charge controlling agents such as quaternary ammonium salts, pyridinum salts, sulfates, phosphates, and carboxylates; flow aid additives; silicone oils; waxes such as commercially available polypropylenes and polyethylenes; and other known additives. Generally, these additives are present in an amount of about 0.05 wt. % to about 30 wt. % (e.g., about 0.1 wt. % to about 25 wt. %, or about 1 wt. % to about 20 wt. %) of the toner composition; however, lesser or greater amounts of the additives can be utilized depending on the particular system and desired properties.

Conventional equipment for dry blending of powders can be used for mixing or blending the surface-treated silica particles with toner particles to form a toner composition.

The toner composition can be prepared by a number of known methods, such as admixing and heating the surface-treated silica particles, the colorants, the binder resin, and optional charge-enhancing additives and other additives in conventional toner (melt) extrusion devices and related equipment. Conventional equipment for dry blending of powders may be used. Other methods include spray drying, melt dispersion, extrusion processing, dispersion polymerization, and suspension polymerization, optionally followed by mechanical attrition and classification to provide toner particles having a desired average size and a desired particle size distribution. Compounding of the pigment and other ingredients with the resin is generally followed by mechanical attrition and classification to provide toner particles having a desired particle size and particle size distribution. Chemical toners, also known as chemically prepared toners, are produced in a liquid phase; the resin particles are generally formed in the presence of the colorant. For example, a process has been developed in which a polymer latex is combined with an aqueous pigment dispersion and agglomerated using a coagulant to form polymer particles. Another process involves the aqueous suspension polymerization of a dispersion of pigment in at least one monomer. Also, a pigment/polyester resin dispersion has been prepared and combined with water, followed by evaporation of the solvent.

The toner composition can be used alone in mono-component developers or can be mixed with suitable dual-component developers. The carrier vehicles which can be used to form developer compositions can be selected from various materials. Such materials typically include carrier core particles and core particles overcoated with a thin layer of film-forming resin to help establish the correct triboelectric relationship and charge level with the toner employed. Suitable carriers for two-component toner compositions include iron powder, ferrite powder, and nickel powder, all of which are typically coated with a resin coating such as an epoxy or fluorocarbon resin, and any other carrier known to those of skill in the art.

As is known to those of ordinary skill in the art, toners may optionally include other additives, for example, for providing free flow control, lubrication, and improved developing and running performance. Such additives may include, for example, inorganic powders including metal oxides of magnesium, zinc, aluminum, cerium, cobalt, iron, zirconium, chromium, manganese, strontium, tin, or antimony; composite metal oxides including calcium titanate, magnesium titanate, or strontium titanate; metal salts including calcium carbonate, magnesium carbonate, or aluminum carbonate; clay minerals such as kaolin; phosphoric acid compounds such as apatite; silicon compounds such as silicon carbide or silicon nitride; or carbon powders such as carbon black and graphite powder. Organic particles or composite particles may also be added, including, e.g., resin particles such as polyamide resin particles, silicone resin particles, silicone rubber particles, urethane resin particles, melamine-formaldehyde resin particles, or acrylic resin particles; or composite particles of any of rubber, wax, fatty acid compound or resin with particles of an inorganic material such as metal, metal oxide or salt, or carbon black. A lubricant powder may also be added and may include, for example, fluorine resins such as Teflon and polyvinylidene fluoride; fluorine compounds such as carbon fluoride; fatty acid metal salts such as zinc stearate; fatty acids, or fatty acid derivatives such as fatty acid esters; molybdenum sulfide; amino acid, or amino acid derivatives.

The tribocharge of toner compositions containing the treated silica particles can be either positive or negative. The tribocharge of a toner composition containing the treated silica particles is affected by the presence of the treated particles. Without wishing to be bound by any theory, it is thought that the presence of the treated silica particles stabilizes and increases the positive or negative tribocharge of toner compositions containing the silica particles. Tribocharge measurements can be made using suitable techniques and equipment known in the art (e.g., Vertex T-150 tribocharger). Measurements can be made after conditioning the toner particles (e.g., of a toner composition comprising about 4 wt. % treated silica particles) overnight in a standard humidity chamber at 30° C. and 80% relative humidity (HH) and at 18° C. and 15% relative humidity (LL).

Toner compositions containing the treated silica particles can be formulated, for example, by mixing 4 wt. % of the treated particles in a laboratory blender with pulverized styrene acrylate toner particles free of any external additives and having an average diameter of 9 μm. Toner compositions containing the treated particles can be developed, for example, by rolling for 30 minutes at a 2/98 wt. % toner/carrier ratio in glass jars. The carrier can be 70 μm Cu—Zn ferrite coated with silicone resin. Samples can be conditioned in a standard humidity chamber at either a high humidity and high temperature (30° C. and 80% relative humidity) or at a low humidity and low temperature (18° C. and 15% relative humidity) overnight.

Without wishing to be bound by any theory, it is believed that the treated fumed silica particles disclosed herein provide one or more of the following properties:
high absolute levels of (negative) tribocharging, which tends to improve image density on the printed page;
excellent humidity resistance, which can enable a consistent level of tribocharging and thus print performance across a range of ambient relative humidity and temperature conditions;
good transfer efficiency due to the lubrication effect of the treatment in aiding movement of the toner from the cartridge, through the machine, and onto the paper with minimal waste.

It had not been previously believed possible to achieve this performance with prior art treatments of fumed silica.

EXAMPLES

Example 1

This example illustrates the preparation of treated silica particles according to the claimed invention.

Figure 1:
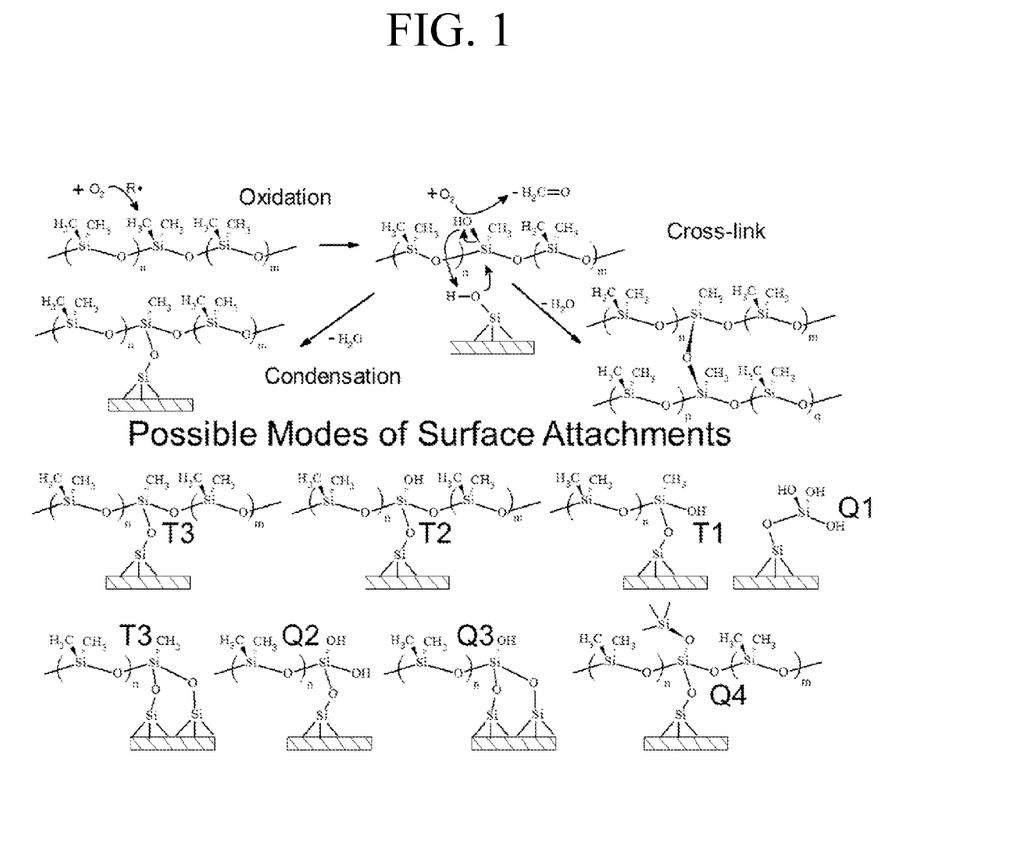
FIG. 1 is a schematic illustration of PDMS attachment to the surface of a silica particle in the presence of air.

The characteristics of various PDMS-treated starting materials are listed in Table 1 (Samples 1-9) and Table 2 (Samples 10-16). $^{29}$Si NMR was used to characterize the functional groups (FIG. 1).

TABLE 1

| PDMS-treated starting materials | Sample 1 | Sample 2 | Sample 3 | Sample 4 | Sample 5 | Sample 6 | Sample 8 | Sample 9 |
|---|---|---|---|---|---|---|---|---|
| M (/nm$^2$) | 0.10 | 0.08 | 0.09 | 0.08 | 0.07 | 0.08 | 0.08 | 0.07 |
| D1 (/nm$^2$) | 0.37 | 0.38 | 0.34 | 0.37 | 0.65 | 0.34 | 0.31 | 0.27 |
| D2 (/nm$^2$) | 0.83 | 0.85 | 0.81 | 0.82 | 0.80 | 0.82 | 0.77 | 0.80 |
| (D1 + D2) (/nm$^2$) | 1.20 | 1.23 | 1.15 | 1.19 | 1.45 | 1.16 | 1.08 | 1.07 |
| T1 | 0.03 | 0.04 | 0.05 | 0.04 | 0.05 | 0.02 | 0.04 | 0.04 |
| T2 | 0.05 | 0.11 | 0.11 | 0.13 | 0.10 | 0.04 | 0.11 | 0.12 |
| T3 | 0.07 | 0.17 | 0.17 | 0.19 | 0.12 | 0.05 | 0.14 | 0.19 |
| TT1 (%) | 20 | 13 | 15 | 11 | 19 | 18 | 14 | 10 |
| TT2 (%) | 33 | 34 | 33 | 36 | 37 | 36 | 38 | 34 |
| Q2 (/nm$^2$) | 0.15 | 0.14 | 0.15 | 0.13 | 0.14 | 0.14 | 0.16 | 0.10 |
| Q3 (/nm$^2$) | 1.75 | 1.74 | 1.68 | 1.70 | 1.68 | 1.75 | 1.67 | 1.57 |
| Q4 (/nm$^2$) | 1.44 | 1.57 | 1.45 | 1.52 | 1.38 | 1.42 | 1.49 | 1.50 |
| Silanol on silica (/nm$^2$) | 2.05 | 2.04 | 1.99 | 1.96 | 1.96 | 2.06 | 2.01 | 1.79 |
| Silanol on silane (/nm$^2$) | 0.47 | 0.57 | 0.55 | 0.60 | 0.55 | 0.41 | 0.50 | 0.46 |

TABLE 2

| PDMS-treated starting materials | Sample 10 | Sample 11 | Sample 12 | Sample 13 | Sample 14 | Sample 15 | Sample 16 |
|---|---|---|---|---|---|---|---|
| Initial Yield Stress, IYS (Pa) | 49.6 | 48.9 | 48.0 | 54.7 | 54.6 | 52.9 | 57.4 |
| Retained Yield Stress (%) | 99.7 | 91.6 | 78.5 | 91.3 | 101.0 | 81.0 | 88.2 |
| Carbon content (%) | 4.97 | 5.52 | 5.5 | 5.58 | 5.55 | 5.46 | 5.642 |
| M (/nm$^2$) | 0.00 | 0.07 | 0.07 | 0.07 | 0.07 | 0.04 | 0.04 |
| D1 (/nm$^2$) | 0.34 | 0.36 | 0.25 | 0.25 | 0.28 | 0.24 | 0.25 |
| D2 (/nm$^2$) | 1.13 | 0.79 | 0.86 | 0.77 | 0.83 | 0.82 | 0.80 |
| (D1 + D2) (/nm$^2$) | 1.47 | 1.15 | 1.11 | 1.01 | 1.11 | 1.06 | 1.05 |
| T1 | 0.00 | 0.01 | 0.04 | 0.00 | 0.04 | 0.00 | 0.00 |
| T2 | 0.00 | 0.01 | 0.06 | 0.09 | 0.08 | 0.05 | 0.07 |
| T3 | 0.00 | 0.02 | 0.15 | 0.15 | 0.18 | 0.04 | 0.16 |
| TT1 (%) | 0 | 25 | 15 | 0.0 | 12.4 | 0.0 | 0.0 |
| TT2 (%) | 0 | 25 | 26 | 37.9 | 27.6 | 57.1 | 30.4 |
| Q2 (/nm$^2$) | 0.11 | 0.10 | 0.02 | 0.04 | 0.05 | 0.08 | 0.06 |
| Q3 (/nm$^2$) | 1.65 | 1.27 | 1.61 | 1.27 | 1.38 | 1.48 | 1.33 |
| Q4 (/nm$^2$) | 1.81 | 1.51 | 1.82 | 1.40 | 1.65 | 1.42 | 1.62 |
| Silanol on silica (/nm$^2$) | 1.86 | 1.47 | 1.65 | 1.34 | 1.49 | 1.64 | 1.43 |
| Silanol on silane (/nm$^2$) | 0.34 | 0.40 | 0.39 | 0.34 | 0.44 | 0.29 | 0.32 |

Some of the PDMS-treated starting materials were then treated with HMDZ, according to the general treatment procedure, as follows:

1) Hydrophobic PDMS-treated fumed silica particles generally containing 5-5.5% carbon and a silica surface silanol content between 0 and 1.5 SiOH/nm$^2$, a silanol on silane content of >0.1/nm$^2$ were fed into a reactor vessel with fluidization capabilities (mechanical or pneumatic).
2) A higher than stoichiometric amount of water with respect to the silazane treating agent (e.g., HMDZ) was added and mixed into the dry powder in the form of "dry water." Dry water is a "water-in-air" emulsion formed using hydrophobic fumed silica as the surface active ingredient and mixing 1-30% hydrophobic silica with 70-99% water. Unless stated otherwise, the dry water was prepared using 80% water and 20% PDMS-treated silica.
3) Treating agent (e.g., HMDZ) was added to the hydrophobic base silica product by atomizing the treating agent while fluidizing the bed for optimal dispersion and distribution of the same.
4) The hydrophobic silica product containing the treating agent was maintained at temperatures between 25-300° C. for anywhere from 5 min to 24 h under nitrogen atmosphere to allow the reaction of the treating agent with the surface of the silica and/or the reactive groups present on the hydrophobic siloxane layer.
5) After the reaction was completed, the byproducts of the reaction were stripped off of the powder/gas mixture and vented or collected for recycling/disposal. This stripping step can be carried out at temperatures between 60-250° C.

The initial yield stress and retained yield stress were determined for each sample. Briefly, the rheological properties were tested as follows: a 15 wt % masterbatch was prepared by measuring the appropriate amount of Bisphenol A diglycidyl ether epoxy resin (e.g., Epon 828 by Momentive®) and silica and mixing the two components in a dual asymmetric-type mixer (e.g., DAC 150 FVZ, Flacktek). This procedure was done in two steps: step 1) 1.5 min @ 2000 rpm, and step 2) 15 min @ 3500 rpm. Satisfactory dispersion was confirmed by measuring for a Hegman grind of 5. The masterbatch was diluted down to a silica concentration of 4 wt % by adding adequate amounts of masterbatch and epoxy resin into a separate cup. The final mixing of the diluted dispersion was done in a dual asymmetric-type mixer at 2000 rpm for 1.5 min. In all cases, the concentrations were prepared to within 0.001 wt %. Table 3 shows the amounts of resin and silica for the masterbatch and also the amounts of masterbatch and resin for the final 4 wt % concentration sample.

TABLE 3

| Masterbatch Component | Wt (g) | Letback Component | Wt(g) |
|---|---|---|---|
| Epoxy resin | 42.5000 | Masterbatch Mixture | 5.3333 |
| Silica | 7.5000 | Epoxy resin | 14.6667 |
| Total | 50.0000 | Total | 20.0000 |

The yield stress of fumed silica in epoxy dispersions was determined using a stress-controlled stepped flow experiment. The stress-controlled step flow experiment was performed as follows: (1) load the sample in a stress-controlled rheometer (e.g., TA Instruments AR2000ex) fitted with a 40 mm diameter flat plate, send to the gap (500 micron), and trim the excess around the plate, (2) perform a pre-shear at 10 s-1 for 2 min, (3) equilibrate for 10 min, and (4) perform a continuous stress sweep from 2500 Pa to 0.001 Pa. The data obtained in the stress-controlled stepped flow experiment to the Herschel-Bulkley model to provide the reported yield-stress values.

Retained yield stress was determined by measuring the initial yield stress at a first time point, aging the sample, and measuring the yield stress at a second time point after aging. To age a sample, the 4 wt % sample prepared according to the procedure described above was placed in an oven at 60° C. for 28 days. After the 28 days, the sample was removed and allowed to cool down to room temperature. The rheology profile was measured according to the method described above.

Table 4 lists the characteristics of treated silica particles according to the claimed invention and the reaction conditions (wt % HMDZ, reaction time, addition of dry water) used to produce the same (Samples 17-26).

TABLE 4

| | Sample 17 | Sample 18 | Sample 19 | Sample 20 | Sample 21 | Sample 22 | Sample 23 | Sample 24 | Sample 25 | Sample 26 |
|---|---|---|---|---|---|---|---|---|---|---|
| PDMS-treated starting material | Sample 12 | Sample 12 | Sample 12 | Sample 13 | Sample 13 | Sample 13 | Sample 13 | Sample 12 | Sample 12 | Sample 12 |
| Initial Yield Stress, IYS (Pa) | 55.1 | 54.9 | 58.4 | 67.4 | 65.6 | 67.9 | 67.4 | 49.8 | 50.9 | 50.4 |
| Retained Yield Stress (%) | 97.9 | 93.3 | 90.9 | 95.5 | 93.6 | 90.0 | 90.1 | 90.4 | 92.1 | 89.2 |
| Carbon content (%) | 5.9 | 5.9 | 6.0 | 5.9 | 5.9 | 6.0 | 6.0 | 5.6 | 5.6 | 5.6 |
| M (/nm2) | 0.71 | 0.77 | 0.80 | 0.57 | 0.58 | 0.70 | 0.73 | 0.24 | 0.29 | 0.25 |
| D1 (/nm2) | 0.30 | 0.28 | 0.28 | 0.28 | 0.30 | 0.24 | 0.28 | 0.31 | 0.26 | 0.26 |
| D2 (/nm2) | 0.77 | 0.77 | 0.72 | 0.80 | 0.80 | 0.76 | 0.81 | 0.92 | 0.84 | 0.87 |
| (D1 + D2) (/nm2) | 1.07 | 1.04 | 1.00 | 1.08 | 1.10 | 1.00 | 1.09 | 1.22 | 1.09 | 1.13 |
| T1 | 0.00 | 0.00 | 0.00 | 0.05 | 0.00 | 0.00 | 0.00 | 0.00 | 0.00 | 0.00 |
| T2 | 0.05 | 0.09 | 0.05 | 0.07 | 0.10 | 0.09 | 0.09 | 0.10 | 0.07 | 0.09 |
| T3 | 0.15 | 0.15 | 0.17 | 0.18 | 0.20 | 0.19 | 0.20 | 0.18 | 0.15 | 0.16 |
| TT1 (%) | 0.0 | 0.0 | 0.0 | 16.3 | 0.0 | 0.0 | 0.0 | 0.0 | 0.0 | 0.0 |
| TT2 (%) | 24.8 | 37.5 | 23.3 | 23.1 | 33.5 | 31.6 | 31.6 | 35.6 | 32.9 | 36.0 |
| Q2 (/nm2) | 0.08 | 0.11 | 0.14 | 0.08 | 0.11 | 0.06 | 0.13 | 0.08 | 0.10 | 0.09 |
| Q3 (/nm2) | 1.85 | 1.80 | 1.72 | 1.53 | 1.69 | 1.72 | 1.61 | 1.70 | 1.52 | 1.63 |
| Q4 (/nm2) | 2.32 | 2.35 | 2.28 | 2.00 | 2.14 | 2.26 | 2.22 | 1.92 | 1.70 | 1.97 |
| Silanol on silica (/nm2) | 2.01 | 2.02 | 2.00 | 1.69 | 1.89 | 1.84 | 1.87 | 1.89 | 1.71 | 1.84 |
| Silanol on silane (/nm2) | 0.35 | 0.37 | 0.34 | 0.45 | 0.40 | 0.33 | 0.38 | 0.41 | 0.33 | 0.35 |
| Process conditions | | | | | | | | | | |
| Reaction time (min) | 60 | 360 | 1200 | 180 | 360 | 180 | 360 | 60 | 360 | 1200 |
| Reaction temperature (° C.) | 25 | 25 | 25 | 25 | 25 | 25 | 25 | 25 | 25 | 25 |
| Concentration of HMDZ (%) | 5 | 5 | 5 | 3 | 3 | 5 | 5 | 3 | 3 | 3 |
| Dry water addition (Y/N) | Y | Y | Y | Y | Y | Y | Y | N | N | N |

Table 5 lists the characteristics of treated silica particles according to the claimed invention prepared at a commercial scale (Samples 27-29). In the preparation of these Samples, the reaction temperature was held at 25° C. for a designated period of time, and then the temperature was increased to expedite the stripping off of reaction byproducts. Samples 27 and 29 were held at 25° C. for approximately 30 min. Sample 28 was held at 25° C. for less than 30 min. It was found that this variation in reaction time did not affect the performance of the resulting material, but reduced the cycle time significantly. In the preparation of Samples 27-29, 5 wt % HMDZ and dry water were used.

TABLE 5

| | Sample 27 | Sample 28 | Sample 29 |
|---|---|---|---|
| PDMS-treated starting material | Sample 16 | Sample 16 | Sample 16 |
| Initial Yield Stress, IYS (Pa) | 74.8 | 72.8 | 73.4 |
| Retained Yield Stress (%) | 91.2 | 93.4 | 96.9 |
| Carbon content (%) | 6.2 | 6.1 | 6.1 |

Figure 2:
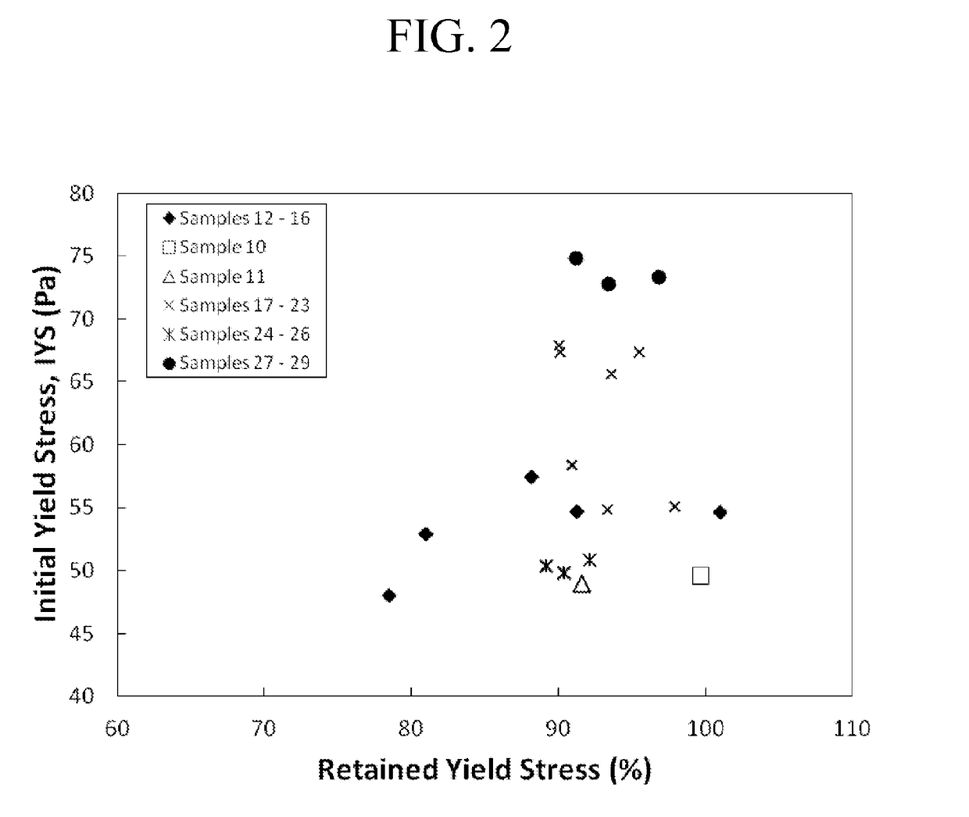
FIG. 2 is a graphical representation of the performance (initial yield stress and percent retained yield stress) of PDMS-treated materials before and after treatment with HMDZ.

The results are reported in FIG. 2. FIG. 2 shows that the rheological performance (initial yield stress and percent retained yield stress) of PDMS-treated materials greatly improves after treatment with HMDZ in accordance with the claimed invention.

Example 2

This example illustrates a method of determining the wet-in time (incorporation time) of treated silica particles into a polar resin.

The ease with which a treated silica material incorporates into a polar resin such as epoxy can be measured by recording the time that takes to incorporate 5.1493 g of treated silica into 115 g of epoxy resin (e.g., Epon 828 by MOMENTIVE®). Using a Cowles blades mixer such as the Dispermat AE with a 3 cm diameter blade, mixing of the pure epoxy resin (115 g±0.005) can be started at a speed of 1000 rpm. After 2 min, the silica powder (5.1493 g±0.005 g) can be added in batches of a few grams, ensuring that after each addition the powder completely disappears from the surface of the vortex created by the mixer. Once the total amount of powder was added, the time that took to complete the addition is recorded.

The treated silica particles, as disclosed herein, have a wet-in time that is significantly less than that of the PDMS-treated silica particle starting materials.

Example 3

This Example describes the preparation and evaluation of toner compositions comprising the treated fumed silica particles.

Hydrophobicity (Methanol Wettability):

The hydrophobicity of the treated silica of ("S-Sample A" prepared according to Examples 27-29 of Example 1) was measured with a powder wettability measuring instrument WET-100P (manufactured by Rhesca Company, Limited). Assuming as 100% the transmittance of light of pure water at 780 nm in wavelength, the wettability was measured in the following way. The treated silica (0.20 g±0.01 g) was added to 50 ml of pure water, where, with stirring by means of a magnetic stirrer (300 rpm), methanol was poured beneath the liquid surface (flow rate: 2.5 ml/5 minutes). The fine silica powder floated on the liquid surface. When the fine silica powder dispersed in the methanol/water mixed solvent, the wettability was determined as being the methanol concentration (% by volume) at a point of time where the transmittance of light at 780 nm in wavelength reached 50%. This result is compared with three control samples: Comparative Sample (i) PDMS-treated silica (base silica is CAB-O-SIL® M-5, Cabot Corporation); Comparative Sample (ii) HMDZ/PDMS-treated silica (base silica is CAB-O-SIL® HS-5, Cabot Corporation); and Comparative Sample (ii) HMDZ/PDMS-treated silica (base silica is CAB-O-SIL® M-5, Cabot Corporation). The HMDZ/PDMS-treatment results from spraying OH-terminated PDMS onto HMDZ-treated silica. The results are shown in Table 6.

TABLE 6

| Sample | Treatment | % Methanol |
|---|---|---|
| S-Sample A | PDMS/HMDZ | 79 |
| Comp (i) | PDMS | 73 |
| Comp (ii) | HMDZ/PDMS | 66 |
| Comp (iii) | HMDZ/PDMS | 68 |

The sample of Example 1 provided a higher methanol concentration, demonstrating that the treated silicas disclosed herein improve hydrophobicity.

Preparation of Toner Sample A (T-Sample A):

Toner was prepared by mixing 50 g polyester toner (size of 8-12 μm, Sinonar, TW) and 1 wt % of the treated silica of using a kitchen blender. To avoid overheating the toner, the blender was pulsed at 5 s intervals for 3 minutes. After blending, the toner-additive mixture was rolled an additional one hour in glass jars for 60 min at about 265 rpm.

Tribocharge of Toner:

Sample A was added to a carrier, 75 micrometer silicone-coated Cu—Zn ferrite particles, at 2 wt % loading. The carrier-toner mixtures were placed in glass jars and put in a humidity chamber for conditioning. HH conditioning was performed at 30° C. and 80% relative humidity; LL conditioning was performed at 18° C. and 15% relative humidity. After conditioning, the glass jar containing the sample was closed with a plastic cap. The toner was developed by rolling the jar on a roll mill at 185 RPM for 30 min; the jar was then removed from the roller and a sample removed and immediately tested for tribocharge. Similar toner-carrier samples were made with Comparative Samples (i)-(iii) (T-Comp (i)-(iii)). The results are listed in Table 7.

TABLE 7

| Toner | Treatment | Silica Loading | L/L (μC/g) | H/H (μC/g) | HH/LL |
|---|---|---|---|---|---|
| T-Sample A | PDMS/HMDZ | 1% | −102 | −37 | 0.37 |
| T-Comp (i) | PDMS | 1% | −100 | −31 | 0.31 |
| T-Comp (ii) | HMDZ/PDMS | 1% | −102 | −32 | 0.31 |
| T-Comp (iii) | HMDZ/PDMS | 1% | −78 | −21 | 0.27 |

It can be seen that toners prepared with the treated silicas disclosed herein demonstrate improved tribocharge at HH conditions and HH/LL performance.

Flowability (Cohesion) of Toner:

Cohesion is one of the means for indicating the flowability of toner. It is assumed that the greater the toner in cohesion, the worse in flowability. The equipment used for measuring the cohesion of the toner used was a powder tester (product of Hosokawa Micron Co., Ltd).

A vibration table was fitted with a 200 mesh screen, a 100 mesh screen, and a 60 mesh screen. The screens were positioned in the order of opening size so that the 60 mesh screen was placed at the top. Toner (5 grams) was placed on the 60 mesh screen. The vibration table was set to have 21.7 V in input voltage, and a vibratory amplitude within a range of 60-90 μm. The table was vibrated for roughly 15 seconds. The amount of toner remaining on each screen was weighed. Cohesion was obtained with the following equation:

Cohesion=(weight g of sample on 60 mesh screen)× 100/5 g+((weight g of sample on 100 mesh screen)×100/5 g)×$\frac{3}{5}$+((weight g of sample on 200 mesh screen)×100/5 g)×$\frac{1}{5}$ Cohesion was measured for toners made with Sample A and Comparative Samples (i)-(iii), and the results are shown in Table 8.

TABLE 8

| Toner additive | Treatment | Silica Loading | Cohesion (% residual) |
|---|---|---|---|
| Sample A | PDMS/HMDZ | 1% | 7.6 |
| Comp (i) | PDMS | 1% | 12.4 |
| Comp (ii) | HMDZ/PDMS | 1% | 14.4 |
| Comp (iii) | HMDZ/PDMS | 1% | 15.3 |

It can be seen that toners prepared with the treated silicas disclosed herein demonstrate improved flowability (reduced cohesion).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the claimed invention and does not pose a limitation on the scope of the claimed invention unless otherwise claimed. No language in the specification should be construed as indicating any non-claimed element as essential to the practice of the claimed invention.

The invention claimed is:

1. A treated fumed silica particle comprising a modified polydialkylsiloxane on the surface thereof, wherein
(a) the modified polydialkylsiloxane (i) comprises a relative proportion of T2 groups of 20% or less, and a relative proportion of T1 groups of 10% or less; and (ii) comprises groups having the structure:

wherein X is a trialkylsilyl or dialkylsilyl; and $R^1$, $R^2$ and $R^3$ are independently hydroxyl, alkyl, alkoxy, silyl, or siloxy; and (b) the treated fumed silica particle has a surface silanol content of about 1.3 to about 2.2 $SiOH/nm^2$.

2. The treated fumed silica particle of claim 1, wherein the particle has a surface energy (SEP04) value of about 4 $mJ/m^2$ or more.

3. The treated fumed silica particle of claim 1, wherein $R^1$ is hydroxyl, alkyl, alkoxy, silyl, or siloxy; and $R^2$ and $R^3$ are alkyl.

4. The treated fumed silica particle of claim 1, wherein the particle exhibits an initial yield stress of 70 Pa or more when dispersed into an epoxy system at a concentration of 4 wt %.

5. The treated fumed silica particle of claim 1, wherein the particle exhibits a wet-in time of about 15 minutes or less when dispersed into an epoxy system at a concentration of 4 wt %.

6. A method for preparing a treated fumed silica particle comprising a modified polydialkylsiloxane on the surface thereof, comprising
(a) dispersing 1-30% polydialkylsiloxane-treated silica particles with 70-99% water to provide a water-in-silica dispersion;
(b) combining the water-in-silica dispersion with a treating agent to provide a reaction mixture, wherein the treating agent comprises (i) a silazane, or (ii) an alkoxysilane or siloxane and an amine; and
(c) maintaining the reaction mixture in an inert atmosphere at 25-300° C. for a time ranging from 5 min to 24 hours to provide the treated fumed silica particle comprising a modified polydialkylsiloxane on the surface thereof, wherein
the modified polydialkylsiloxane (i) comprises a relative proportion of T2 groups of 20% or less, and a relative proportion of T1 groups of 10% or less; and (ii) comprises groups having the structure:

wherein X is a trialkylsilyl or dialkylsilyl; and $R^1$, $R^2$ and $R^3$ are independently hydroxyl, alkyl, alkoxy, silyl, or siloxy; and
the treated fumed silica particle has a surface silanol content of about 1.3 to about 2.2 $SiOH/nm^2$.

7. The method of claim 6, wherein the reaction mixture comprises 1-15 wt % of the treating agent based on the weight of the dry silica.

8. The method of claim 6, wherein the treating agent is atomized when combined with the water-in silica dispersion.

9. The method of claim 6, wherein the treating agent is hexamethyldisilazane.

10. The method of claim 6, wherein the treating agent is trimethylmethoxysilane.

11. The method of claim 6, wherein the amine is a primary amine.

12. The method of claim 6, wherein the reaction mixture is maintained at 25-60° C. for a time ranging from 10 min to 6 hours.

13. The method of claim 6, wherein the reaction mixture is maintained under fluidizing conditions.

14. The method of claim 6, wherein the water-in-silica dispersion comprises greater than a stoichiometric amount of water relative to the treating agent.

15. The method of claim 6, wherein the polydialkylsiloxane-treated silica particle comprises 5-7% carbon, a surface silanol content of 0-1.5 $SiOH/nm^2$, and a silanol on silane content of 0.1 $SiOH/nm^2$ or lower.

16. The method of claim 6, further comprising venting byproducts of the reaction at a temperature ranging from 60 to 300° C.

17. A rheological system comprising a polar liquid and 0.5-15% by weight of the treated fumed silica particles of claim 1.

18. The rheological system of claim 17, wherein the polar fluid is selected from the group consisting of epoxy resins, unsaturated polyester resins, polyurethane, silane-terminated polymers, vinyl ester resins, acrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulphide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles, polysulphones or mixtures thereof.

19. The rheological system of claim 17 wherein the relative change in initial yield stress is 20% higher or more than the starting treated fumed silica particle when dispersed into an epoxy system at a concentration of 4 wt %.

20. The rheological system of claim 17, wherein the retained viscosity of the system over a period of 28 days is about 90% or higher.

21. A toner composition comprising toner particles and the treated fumed silica particles of claim 1.

22. The rheological system of claim 17, wherein the initial yield stress of the rheological system is 70 Pa or more.

* * * * *